May 27, 1958

G. E. ROY 2,835,903

MEANS FOR CONVERTING A STATION WAGON
TO SLEEPING ACCOMMODATION

Filed Oct. 4, 1955

INVENTOR.
GERARD E. ROY
BY
ATTORNEY.

May 27, 1958  G. E. ROY  2,835,903
MEANS FOR CONVERTING A STATION WAGON
TO SLEEPING ACCOMMODATION
Filed Oct. 4, 1955  2 Sheets-Sheet 2

INVENTOR.
GERARD E. ROY
BY
ATTORNEY

United States Patent Office 2,835,903
Patented May 27, 1958

2,835,903

MEANS FOR CONVERTING A STATION WAGON TO SLEEPING ACCOMMODATION

Gerard Eugene Roy, Encinitas, Calif.

Application October 4, 1955, Serial No. 538,455

2 Claims. (Cl. 5—118)

For touring purposes and for evacuation of casualties from urban communities in an emergency, it is desirable to render an automotive vehicle readily convertible for sleeping purposes or so as to serve as an ambulance.

The type of vehicle known as a station or ranch wagon lends itself very well to this purpose in that some or all of the rear seats are usually removable or collapsible whereby a relatively large area becomes free or unobstructed. Attempts have heretofore been made to render vehicles of this type convertible to provide sleeping facilities, but all such efforts of which I am aware have involved complicated structure which cannot be easily and quickly set up or dismantled and which, when set up, obstruct most, if not all, of the floor area, thereby minimizing or eliminating the space needed for storing luggage.

The object of this invention is to produce an extremely simple and durable arrangement which can be set up or dismantled with minimum effort and in a minimum of time and which, when set up, does not use any of the floor space which thus remains available for storing luggage and the like.

A further object of the invention is to produce a compact and inexpensive kit which, when not in use, can be stored in a small package and stored under one of the seats or in some other small available space.

These and other objects are obtained by my invention as set forth in the following specification and as illustrated in the accompanying drawings in which.

Figure 3:
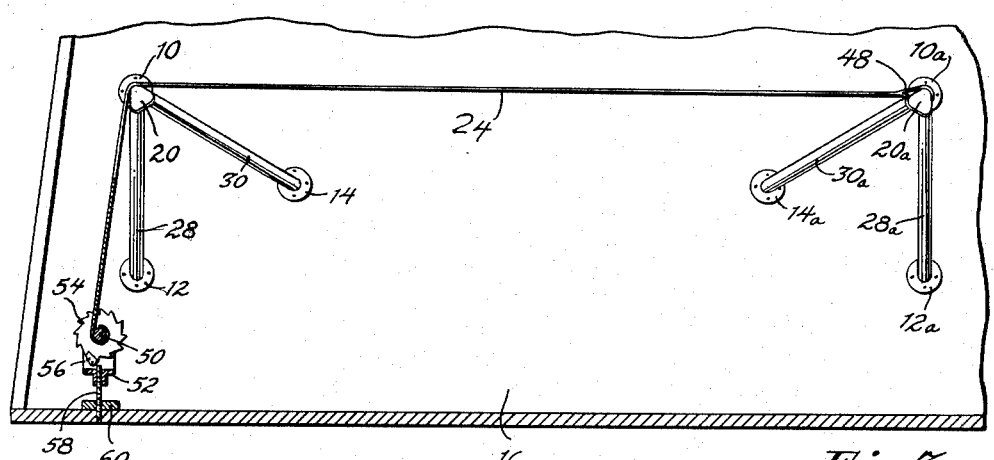
Fig. 3 is a fragmentary verticle sectional view taken on line 3—3 of Fig. 2.
Figure 6:
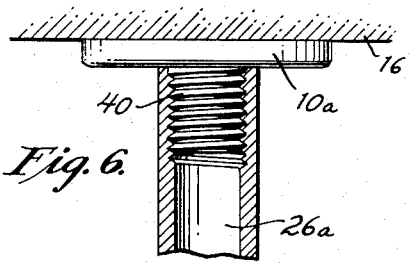
Fig. 6 is an enlarged fragmentary view taken on line 6—6 on Fig. 2.
Figure 7:
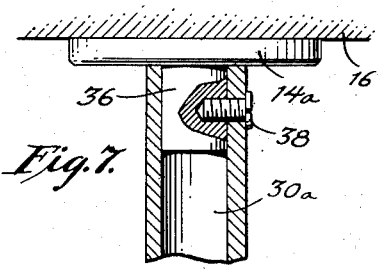
Fig. 7 is an enlarged fragmentary view taken on line 7—7 on Fig. 2.

To carry out my invention I permanently attach sets of brackets 10, 12 and 14 to the interiors of opposite side walls 16 and 18 of the station wagon near the rear ends thereof, and I attach similar sets of brackets 10a, 12a, and 14a to the interiors of the opposite side walls 16 and 18 near the front end thereof. Brackets 10 and 10a are of the structure shown in Fig. 6 while brackets 12 and 14 and 12a and 14a are of the structure shown in Fig. 7. The manner in which said brackets are arranged is best shown in Fig. 3.

The sets of brackets referred to are adapted detachably to support inwardly projecting tripods for supporting the webbing 24 which constitutes the bedding, or which will serve as a support for the bedding.

Each of the rear tripods is formed of a finial 20 and arms 26, 28 and 30 and each of the front tripods is formed of a finial 28a and arms 26a, 28a and 30a. Since the structure and method of assembly of all tripods, on both walls of the station wagon, are the same, only the structure and assembly of the tripod formed of finial 20a and arms 26a, 28a and 30a, will be described.

Figure 4:
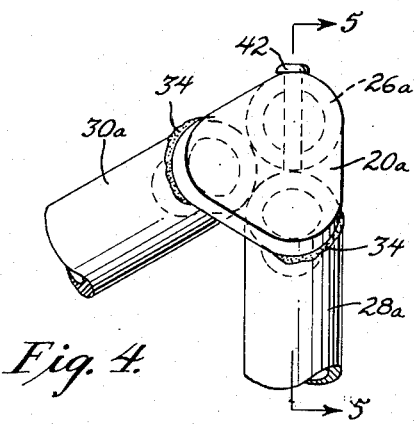
Fig. 4 is a fragmentary enlarged view looking in the direction of line 4—4 on Fig. 2.
Figure 5:
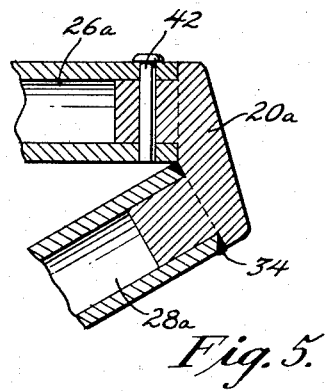
Fig. 5 is a fragmentary sectional view taken on line 5—5 on Fig. 4.

As best shown in Figs. 4 and 5, inner ends of arms 28a and 30a are permanently secured to finial 20a, as by welding 34, or otherwise, and their outer ends are slipped over studs 36 carried by brackets 12a and 14a and are secured to said studs by set screws 38. The outer end of upper arm 26a threadedly engages a screw 40 which is carried by bracket 10a and the inner end of arm 26a is secured to finial 20a by pin 42.

To set up the bedding support, the outer end of arm 26a is threaded onto screw 40 of bracket 10a, the outer ends of arms 28a and 30a are slipped over studs 36 of brackets 12a and 14a, finial 20a, which is carried by the inner ends of arms 28a and 30a, is engaged with the inner end of arm 26a, pin 42 is inserted to secure the finial to arm 26a, and set screws 38 are tightened to fasten arms 28a and 30a to brackets 12a and 14a. The same operation is repeated in connection with arms 26, 28 and 30 and with the corresponding sets of supports on wall 18 of the station wagon.

To provide bedding, or a bedding support, I use webbing 24, one end of which is formed into the loop 43 through which arm 26a of the front support is adapted to be passed, and the other end of which is permanently secured to shaft 50 which is carried by bracket 52 located near the rear end of the floor of the vehicle.

Figure 1:
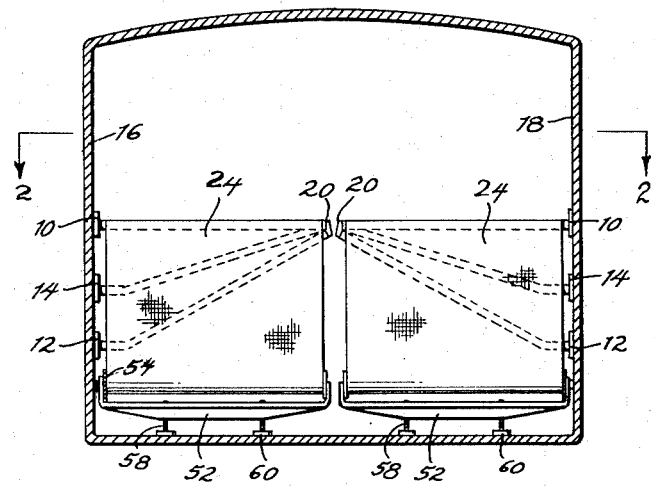
Fig. 1 is a fragmentary diagrammatic rear elevational view of a station wagon type vehicle, embodying my invention.
Figure 2:
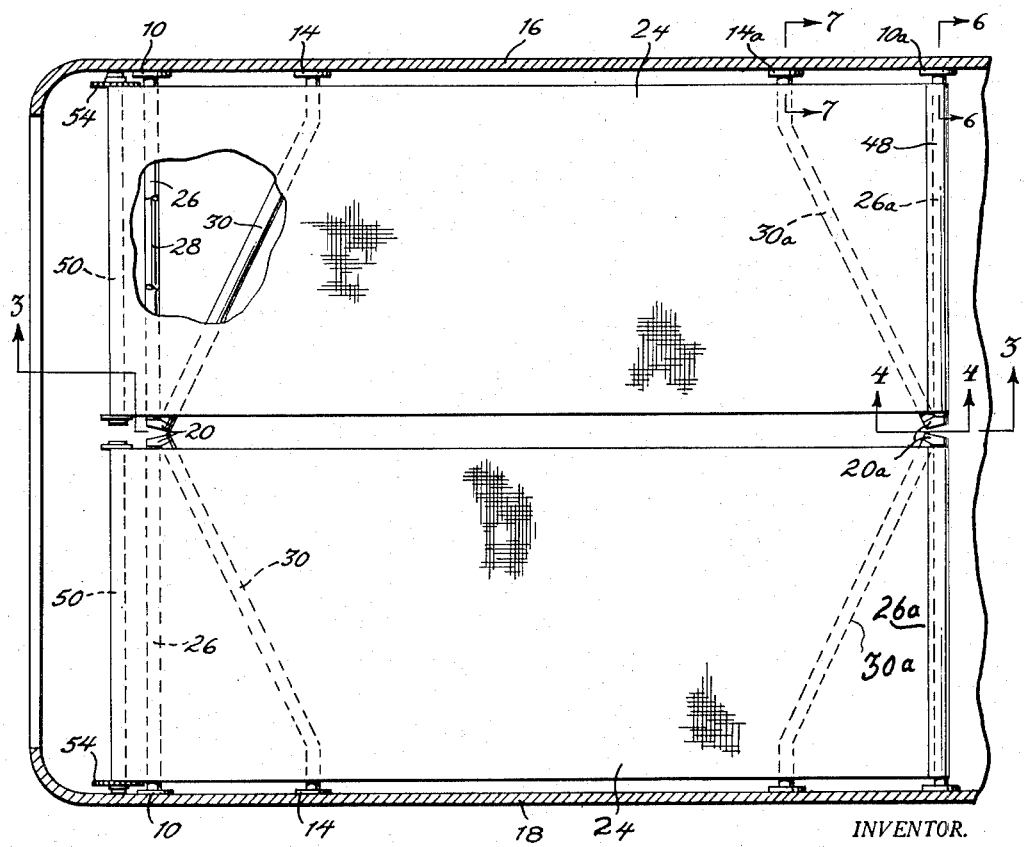
Fig. 2 is an enlarged horizontal sectional view taken on line 2—2 in Fig. 1.

Shaft 50 is adapted to be turned by a crank, not shown, so as to take up some of the webbing and to make the upper horizontal portion of the webbing taut. Counter-rotation of shaft 50 is prevented by means of a ratchet 54 and a pawl 56 in the usal manner. Bracket 52 is adjustable vertically relative to the floor of the vehicle by means of a stud 58, the upper portion of which has a right hand screw thread and the lower portion of which has a left hand screw thread. Stud 58 may be secured permanently to the floor of the vehicle or it may be threaded into a socket 60 which is permanently secured to the floor of the vehicle. As shown in Fig. 2, the web is made in two separate pieces, one on one side of the vehicle and one on the other so as to constitute separate beds or bed supports. If desired, the web can be made in a single piece which spans the entire width of the interior of the vehicle.

From the foregoing it will be seen that by passing arm 26a through loop 43 at the end of the webbing and then threading it onto screw 40, or vice versa, and by fastening the outer ends of arms 28a and 30a to studs 36 by screws 38, and by fastening the inner end of arm 26a to finial 20a by pin 42, a complete unit is set up. Obviously, it takes very little time, skill or effort, and no tools at all, to set up the four sets of supports used in the illustrated embodiment and it takes little time or skill or effort to stretch the webbing over the supports.

It will also be seen that when the supports are removed, only flat brackets 10, 12 and 14, and socket 60, when used, will remain on the side walls and floor of the vehicle. These are inconspicuous and take no usable room at all. The supports themselves, when not in use, can be hidden under the seats or in other spaces which are needed or useful for luggage and other big objects.

Instead of being welded as at 34, the inner ends of the inclined arms of the supports may be also detachably secured to the corresponding finials by pins 42 after the fashion of the horizontal arms of the supports.

It will further be seen that the webbing is stretched at a distance above the floor of the vehicle so that it does not detract from the luggage storage capacity of the vehicle and in an emergency, the unobstructed floor of the vehicle will be available for additional bedding.

While I have illustrated the use of the invention in a station wagon type vehicle, my invention can also be used in a truck or in any vehicle which has continuous walls on which the horizontal or cantilever tripod supports may be mounted.

What I claim is:

1. Means for readily converting the interior of a motor vehicle of the type known as a station wagon and which includes a floor and at least one vertical side wall extending from the front to the rear of the vehicle, into a bedchamber comprising a readily mountable and demountable sleeping cot, said means including a first set of spaced, angularly arranged brackets secured to said side wall near the front end thereof, a second set of angularly arranged brackets secured to said side wall near the rear end thereof, a first threaded member carried by one of the first set of brackets, a second threaded member carried by one of the brackets of the second set of brackets, studs carried by the other brackets of each of said sets of brackets, a first arm having one end thereof tapped for engagement with said first threaded member, a second arm having an end thereof tapped for engagement with said second threaded member, a first set of arms having hollow ends for receiving the studs of the first set of brackets, a second set of arms having their ends hollow for receiving the studs of the second set of brackets, a first finial engaging the other ends of all of the arms associated with the first set of brackets to form a first tripod projecting inwardly from said side wall, a second finial for engaging the other ends of all of the arms associated with said second set of brackets respectively to form a second tripod projecting inwardly from said side wall and spaced from said first tripod, means for detachably securing said first and second finials to the ends of their respective arms, and a horizontal support carried by said first and second tripods.

2. The structure recited in claim 1 in which said support is a flexible web, and means detachably engaging one end of said web over at least one of the arms associated with the first set of brackets, said web being also passed over the corresponding arm of the second set of brackets, and fixed take-up means detachably engageable with the other end of said web to stretch said web taut.

References Cited in the file of this patent

UNITED STATES PATENTS

| | | |
|---|---|---|
| 185,903 | Fette | Jan. 2, 1877 |
| 238,236 | Hunter | Mar. 1, 1881 |
| 238,470 | Woodruff | Mar. 1, 1881 |
| 669,363 | Fieldhouse | Mar. 5, 1901 |
| 828,131 | Lein | Aug. 7, 1906 |
| 930,837 | Hurst | Sept. 11, 1906 |
| 1,059,467 | Hoy | Apr. 22, 1913 |
| 1,943,648 | Wessman | Jan. 16, 1934 |
| 2,565,204 | Cudini | Aug. 21, 1951 |
| 2,573,275 | Richey | Oct. 30, 1951 |

FOREIGN PATENTS

| | | |
|---|---|---|
| 268,187 | Great Britain | Mar. 31, 1927 |